United States Patent [19]
Nagano et al.

[11] Patent Number: 5,802,231
[45] Date of Patent: Sep. 1, 1998

[54] FLAT OPTICAL FIBER CABLE

[75] Inventors: Ryuichiro Nagano, Tokyo; Yoichi Nagase; Hajime Tamura, both of Gyoda, all of Japan

[73] Assignees: Nippon Telegraph and Telephone Corporation; Toyokuni Electric Cable Co., Ltd., both of Tokyo, Japan

[21] Appl. No.: 754,448

[22] Filed: Nov. 19, 1996

[51] Int. Cl.⁶ .................................................. G02B 6/44
[52] U.S. Cl. ................................. 385/114; 385/602
[58] Field of Search ................................. 385/100–114

[56] References Cited

U.S. PATENT DOCUMENTS 5,062,685  11/1991  Cain et al. .................................. 385/114
5,071,221  12/1991  Fujitani et al. ........................... 385/114
5,319,730  6/1994   Rasanen et al. ......................... 385/114
5,621,842  4/1997   Keller ....................................... 385/114

*Primary Examiner*—John Ngo
*Attorney, Agent, or Firm*—Jordan and Hamburg

[57] ABSTRACT

A flat optical fiber cable is composed of an optical fiber ribbon cord which is comprised of tensile strength fiber having a rectangular shape covering an outside circumferential part of several optical fiber cores which are parallel one another and a sheath covers an outside circumferential part of the tensile strength fiber. The tension member is parallel to both sides of the optical fiber ribbon cord forming a row, and the outside circumferential part of the tension member and the optical fiber ribbon cord is covered with a sheath having a nearly oval shape. Because the flat optical fiber cable is formed in this way, it is easy to construct and assemble terminals and damage to the optical fiber and deterioration of performance is prevented.

9 Claims, 6 Drawing Sheets

FLAT OPTICAL FIBER CABLE

BACKGROUND OF THE INVENTION

This invention relates to an optical fiber ribbon core which is paralleled several optical fiber cores in a row of a flat optical fiber cable which is paralleled optical fiber cord in a row.

Former optical fiber ribbon cord type cable lies and arranges the outside circumferential part of tension member, and has been covered with a sheath through ribbon.

Because the above-mentioned former optical fiber ribbon cord type cable was hard and thick, it was difficult to perform the construction and manage to terminal, and there was a fault that the large laying area is required.

SUMMARY OF THE INVENTION

In view of the foregoing, it is an object of the present invention to provide a flat optical fiber cable which does not make optical fiber damage and does not make the performance of optical fiber fall because it is easy to perform the operating of the construction and terminal management.

It is another object of the present invention to provide a flat optical fiber cable which requires small lying area because it is easy to perform the operation of construction and terminal management.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

DESCRIPTION OF THE PREFERRED EMBODIMENT

Preferred embodiments of the present invention will be described in more details referring to the accompanying drawings.

FIGS. 1 to 4 illustrate the first embodiment of the present invention, a flat optical fiber cable 1 is composed of an optical fiber ribbon cord 2, tension members 3, 3 which are arranged so as to parallel in a row at both ends of this optical fiber ribbon cord 2, and a sheath 4 which covers the outside circumferential part of optical fiber ribbon cord 2 and tension members 3, 3 so as to become a nearly oval shape.

Figure 1:
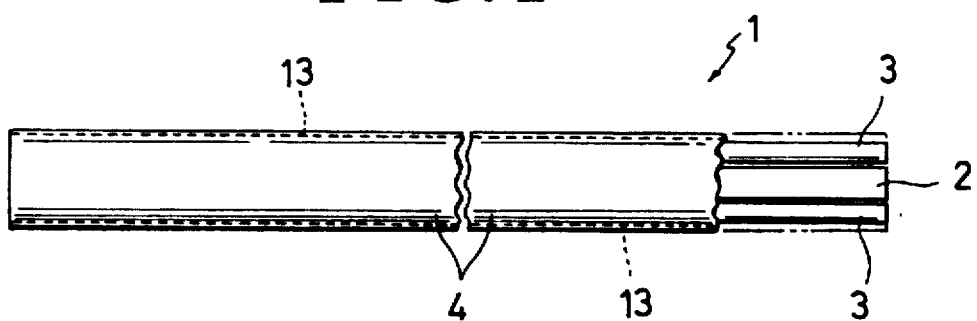
FIG. 1 is a partial cutaway top view showing the first embodiment of the present invention.
Figure 2:
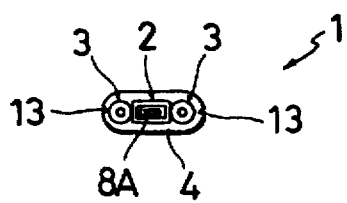
FIG. 2 is a side view showing the first embodiment of the present invention.
Figure 3:
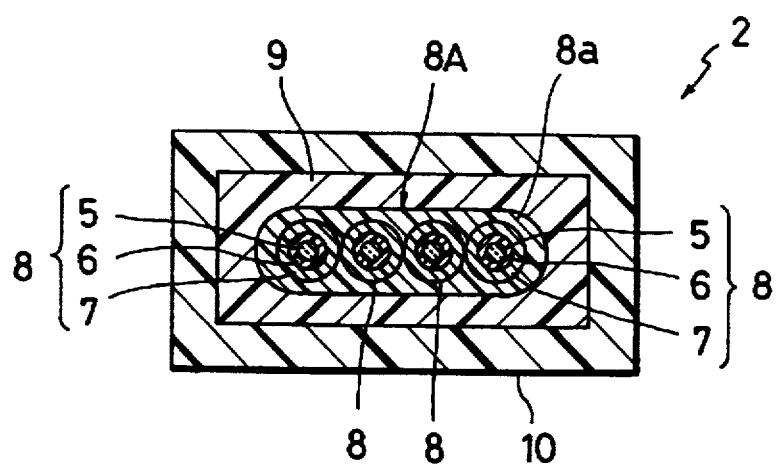
FIG. 3 is an expanded sectional view for optical fiber ribbon cord showing the first embodiment of the present invention.

An optical fiber ribbon cord 2 shown FIG. 3 is comprised four pieces of optical fiber cores 8, 8, 8, 8, optical fiber ribbon core 8A, tensile strength fiber 9, and the sheath for cord 10. Several optical fiber cores, four pieces of optical fiber cores in this embodiment, 8, 8, 8, 8, consist of optical fiber 5, and the inner layer 6 and outer layer 7 which covered the outside circumferential part of the optical fiber 5. Optical fiber 5 is used in general use, and inner layer 6 and outer layer 7 are used ultraviolet curuble resin. Optical fiber ribbon core 8A covers the outside circumferential part of four pieces of optical fiber cores 8, 8, 8, 8 with ultraviolet curable resin 8a so as to become an oval shape. Tensile strength fiber 9 covers the outside circumferential part of optical fiber ribbon core 8A so as to become a quadrilateral of a rectangular shape. The sheath for cord 10 covers the outside circumferential part of tensile strength fiber 9.

Figure 4:
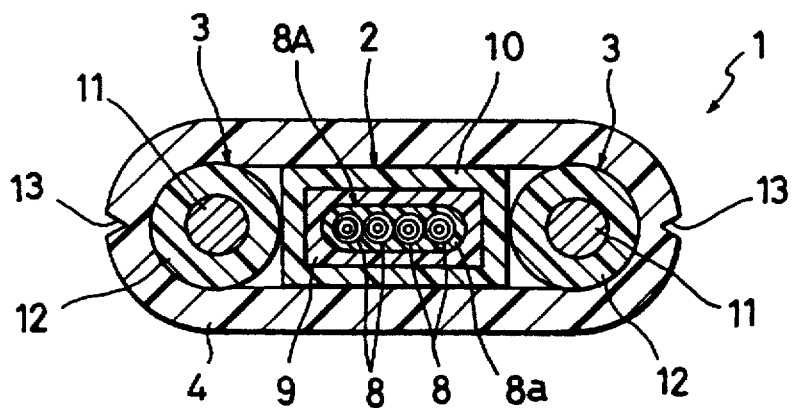
FIG. 4 is an expanded sectional view showing the first embodiment of the present invention.

Tension member 3 shown FIG. 4 is formed as its height measure is a nearly same amount to height measure of optical fiber ribbon cord 2 or higher than the height measure of optical fiber ribbon cord 2.

Although this tension member 3 is used it in general use, tension member 3 in this embodiment is used it which covers the outside circumferential part of steel wire 11 with a sheath 12.

A sheath 4 is used the material in general use. And it forms torn slots 13, 13 at the central part at both sides which correspond with tension members 3, 3 for tearing in order to take out the sheath 4 of a terminal easily at the time of terminal management.

Because flat optical fiber cable 1 has tension members 3, 3 parallel to both sides of the optical fiber ribbon cord 2, the tension members 3, 3 receive tractive force and pushing pressure, and the tension members 3, 3 prevent forces being transmitted to the optical fiber ribbon core 8A of optical fiber ribbon cord 2.

DIFFERENT PREFERRED EMBODIMENT OF THE INVENTION

Other embodiments of the present invention will now be described referring to FIGS. 5 to 19. Though the drawings of the embodiments, like components are denoted by like numerals as of the first embodiment and will be explained in more details.

Figure 5:
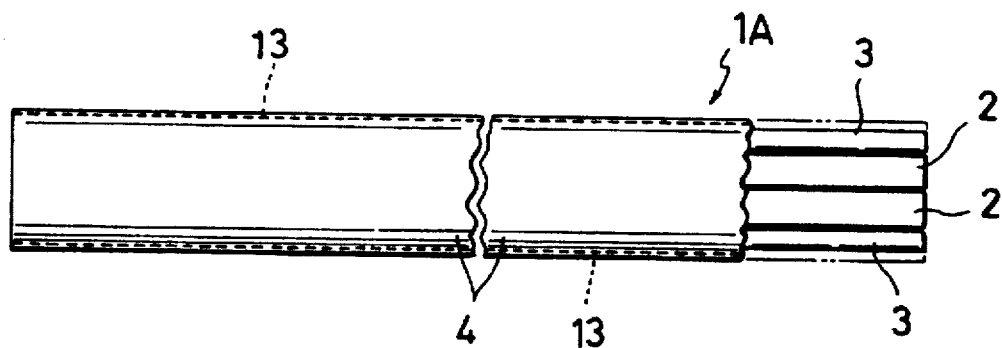
FIG. 5 is a partial cutaway top view showing the second embodiment of the present invention.
Figure 6:
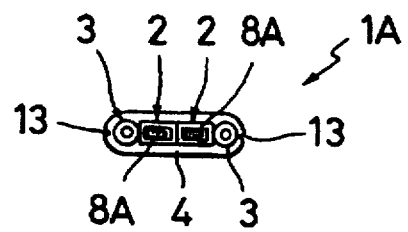
FIG. 6 is a side view showing the second embodiment of the present invention.
Figure 7:
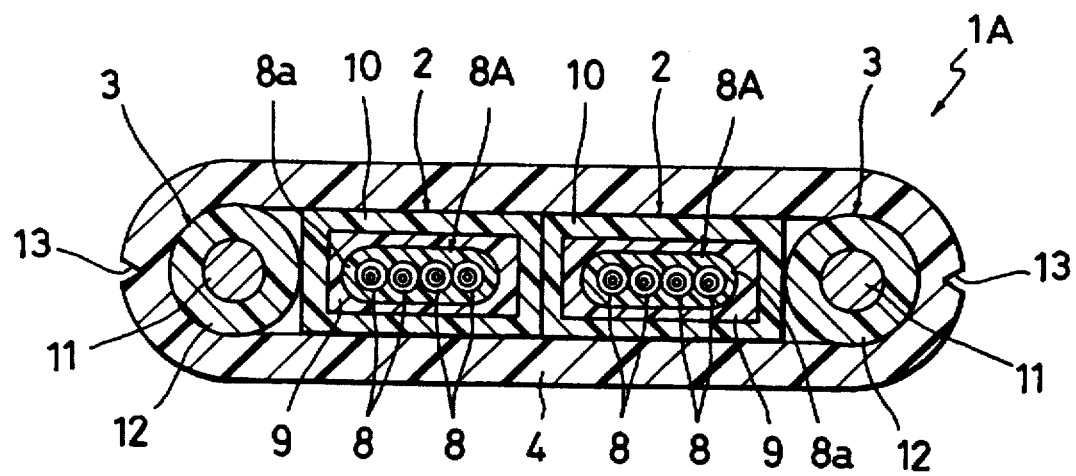
FIG. 7 is an expanded sectional view showing the second embodiment of the present invention.

FIGS. 5 to 7 show the second embodiment of the present invention which is distinguished from the first embodiment by the fact that tension members 3, 3 were arranged in a row at both ends of several optical ribbon cords 2, 2, however, two pieces of optical fiber ribbon cords 2, 2 in this invention. A flat optical fiber cable 1A which was formed in this way according to the second embodiment will provide the same effects as the first embodiment.

Figure 8:
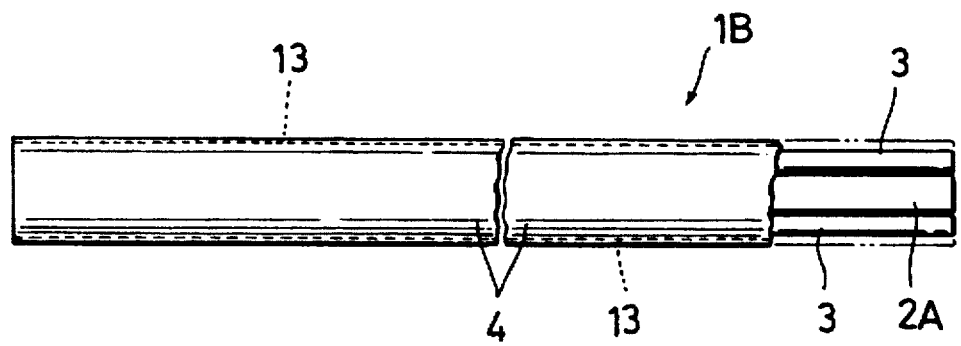
FIG. 8 is a partial cutaway top view showing the third embodiment of the present invention.
Figure 9:
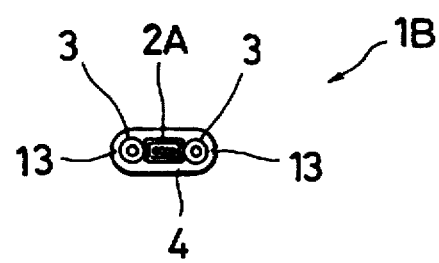
FIG. 9 is a side view of the third embodiment of the present invention.
Figure 10:
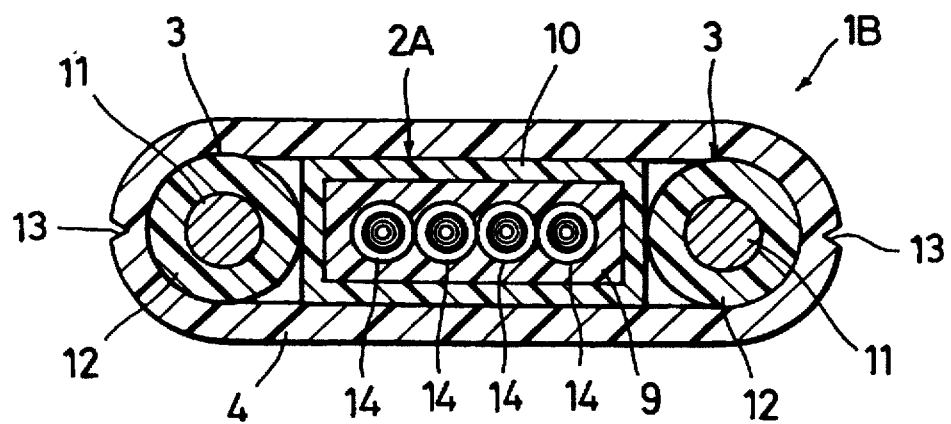
FIG. 10 is an expanded sectional view showing the third embodiment of the present invention.

FIGS. 8 to 10 show the third embodiment of the present invention which is distinguished from the first embodiment by the fact that optical fiber ribbon cord 2A is formed with using four pieces of optical fiber cords 14, 14, 14, 14 which are paralleled in a row. A flat optical fiber cable 1B with optical fiber ribbon cord 2A according to the third embodiment will provide the same effects as the first embodiment.

Figure 11:
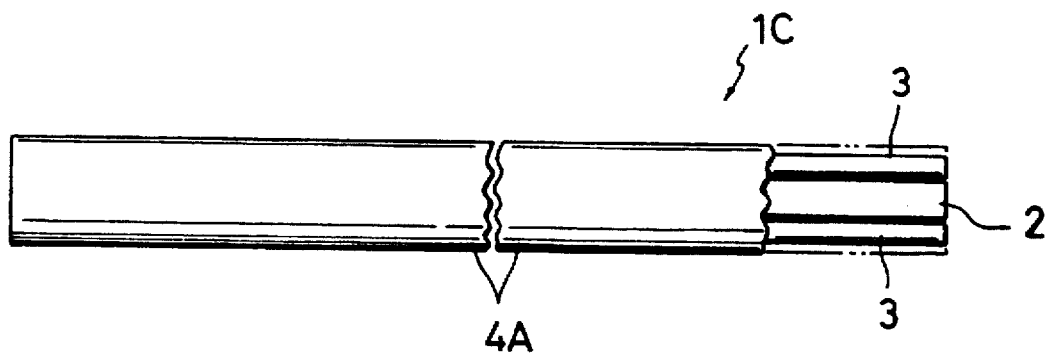
FIG. 11 is a partial cutaway top view showing the fourth embodiment of the present invention.
Figure 12:
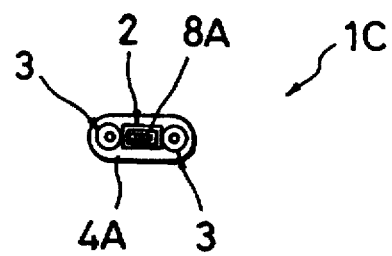
FIG. 12 is a side view showing the fourth embodiment of the present invention.
Figure 13:
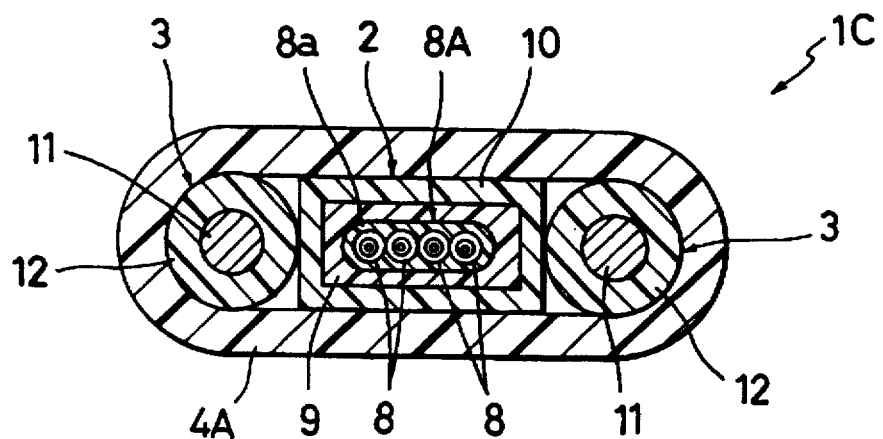
FIG. 13 is an expanded sectional view showing the fourth embodiment of the present invention.

FIGS. 11 to 13 show the fourth embodiment of the present invention which is distinguished from the first embodiment by the fact that a sheath 4A without a torn slow is used. A flat fiber cable 1C with sheath 4A according to the fourth embodiment will provide the same effects as the first embodiment.

Figure 14:
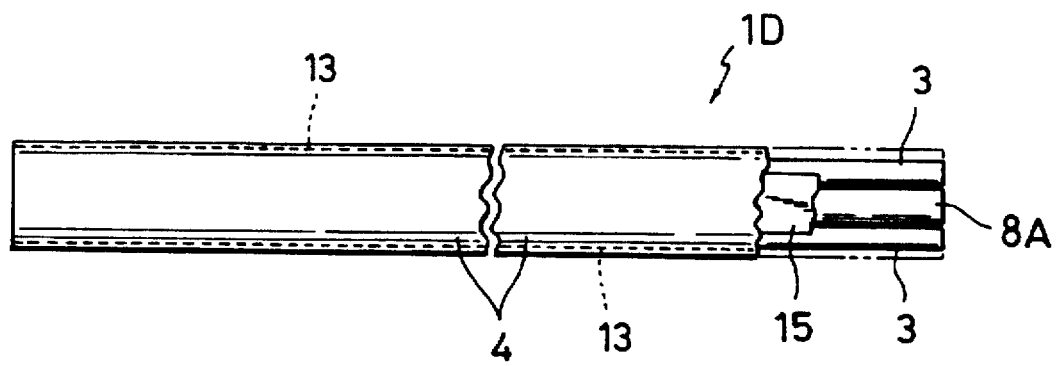
FIG. 14 is a partial cutaway top view showing the fifth embodiment of the present invention.
Figure 15:
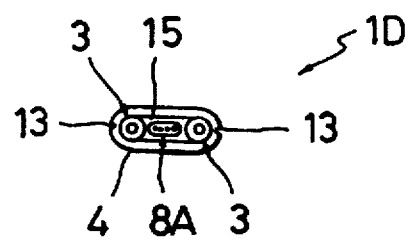
FIG. 15 is a side view showing the fifth embodiment of the present invention.
Figure 16:
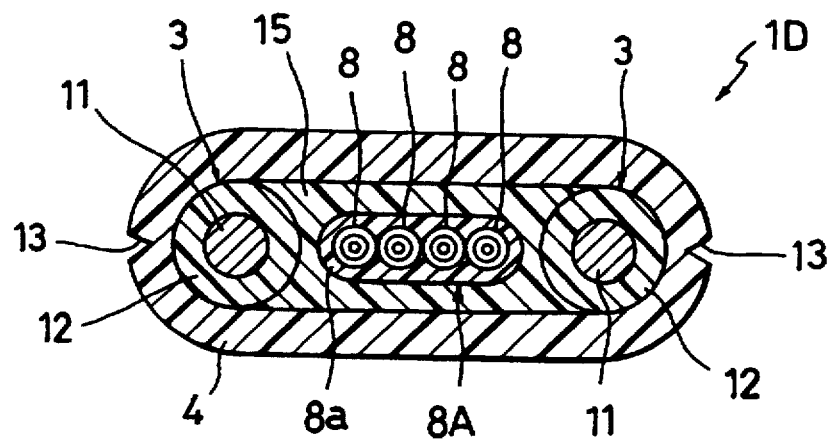
FIG. 16 is an expanded sectional view showing the fifth embodiment of the present invention.

FIGS. 14 to 16 show the fifth embodiment of the present invention which is distinguished from the first embodiment by the fact that optical fiber ribbon core 8A which covered with a shock absorbing material 15 is established between tension members 3, 3. A flat optical fiber cable 1D with optical fiber ribbon core 8A according to the fifth embodiment will provide the same effects as the first embodiment.

Figure 17:
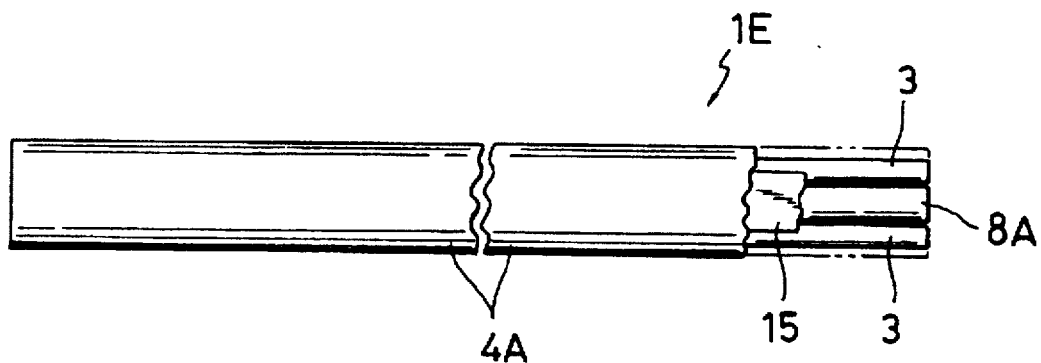
FIG. 17 is a partial cutaway top view showing the sixth embodiment of the present invention.
Figure 18:
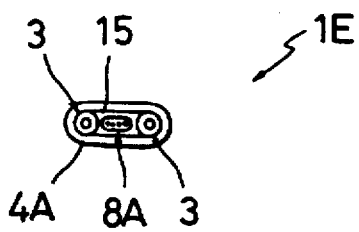
FIG. 18 is a side view showing the sixth embodiment of the present invention.
Figure 19:
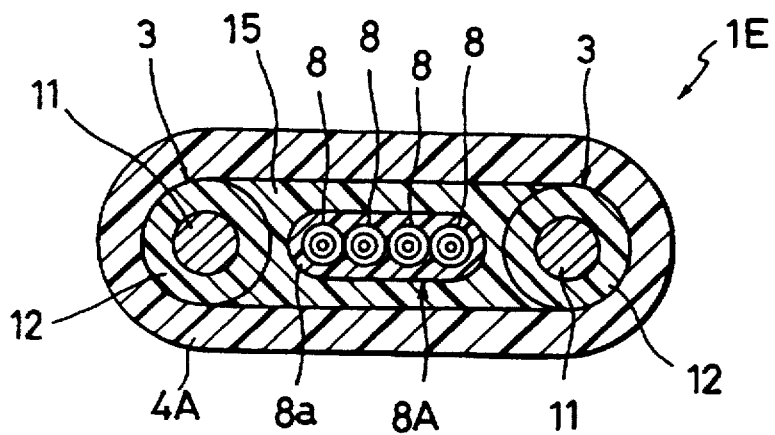
FIG. 19 is an expanded sectional view showing the sixth embodiment of the present invention.

FIGS. 17 to 19 show the sixth embodiment of the present invention which is distinguished from the fifth embodiment by the fact that a sheath 4A without a torn slot is used. A flat optical fiber cable 1E with a sheath 4A according to the sixth embodiment will provide the same effects as the fifth embodiment.

ADVANTAGES OF THE INVENTION

As set forth above, the advantages of the present invention are as follows:

(1) A flat optical fiber is composed of at least an optical fiber ribbon cord or more, tension member, and a sheath. At least an optical fiber ribbon cord or more consists of several optical fiber cores which were paralleled in a row, a tensile strength fiber which covered the outside circumferential part of several optical fiber core so as to become a quadrilateral shape, and the sheath for cord which covers the outside circumferential part of the tensile strength fiber. The tension member is arranged so as to parallel at both sides part of at least an optical fiber ribbon cord or more which was paralleled in a row. A sheath covers so as to become an oval shape at the outside circumferential part of the optical fiber ribbon cord and tension member which was paralleled in a row. Then, it can protect from tractive force and pushing pressure by tension member which was paralleled to both sides of optical fiber ribbon cord that several optical fiber cores parallel in a row.

Therefore, flat optical fiber can be used for the wiring in a floor surface and the like.

(2) As depicted in the above paragraph (1), because it is used optical fiber ribbon cord which was paralleled to several optical fiber cores in a row, it can be prevented efficiently to shift the position of optical fiber core at the time of producing and be paralleled accurately an optical fiber ribbon cord and tension member into a sheath.

Therefore, it can make reliable products.

(3) As depicted in the above paragraph (1), it can be manufactured easily because the construction is simple.

What is claimed is:

1. A flat optical fiber cable comprising:
    at least one optical fiber ribbon cord including optical fiber cores disposed parallel one another in a row;
    said at least one optical fiber ribbon cord having a tensile strength fiber covering having a quadrilateral shaped cross section fixedly encasing said row of said optical fiber cores, and a first sheath fixedly encasing said tensile strength fiber covering;
    first and second tension members respectively disposed parallel to opposite sides of said at least one optical fiber ribbon cord and in a plane defined by said row of said optical fiber cores; and
    a second sheath contacting and covering said first and second tension members and said at least one optical fiber ribbon cord and fixating said at least one optical fiber ribbon cord between said first and second tension members.

2. A flat optical fiber cable comprising:
    at least one optical fiber ribbon cord including optical fiber cores disposed parallel one another in a row;
    said at least one optical fiber ribbon cord having a tensile strength fiber covering having a quadrilateral shaped cross section encasing said row of said optical fiber cores, and a first sheath encasing said tensile strength fiber covering;
    first and second tension members respectively disposed parallel to opposite sides of said at least optical fiber ribbon cord and in a plane defined by said row of said optical fiber cores;
    a second sheath covering said tension member and said at least one optical fiber ribbon cord; and
    said second sheath having a first and second tear slot respectively formed in opposite outside surfaces of said second sheath to facilitate tearing away said second sheath from said at least one optical fiber ribbon cord and said first and second tension members to permit terminal assembly.

3. A flat optical fiber cable according to claim 1, wherein said first and second tension have a thickness greater than a height of said at least one optical fiber ribbon cord.

4. A flat optical fiber cable comprising:
    a row of optical fiber ribbon cords disposed parallel one another and defining a common ribbon plane;
    each of said optical fiber ribbon cords including optical fiber cores disposed parallel one another in a row in said common ribbon plane;
    said optical fiber ribbon cords each having a tensile strength fiber covering having a quadrilateral shaped cross section fixedly encasing said row of said optical fiber cores, and a first sheath fixedly encasing said tensile strength fiber covering;
    first and second tension members respectively disposed parallel to opposite sides of said row of said optical fiber ribbon cords and in said common ribbon plane defined by said row of said optical fiber cords; and
    a second sheath contacting and covering said first and second tension members and said optical fiber ribbon cords and fixating said optical fiber ribbon cords between said first and second tension members.

5. A flat optical fiber cable comprising:
    a row of optical fiber ribbon cords disposed parallel one another and defining a common ribbon plane;
    each of said optical fiber ribbon cords including optical fiber cores disposed parallel one another in a row in said ribbon plane;

said optical fiber ribbon cords each having a tensile strength fiber covering having a quadrilateral shaped cross section encasing said row of said optical fiber cores, and a first sheath encasing said tensile strength fiber covering;

first and second tension members respectively disposed parallel to opposite sides of said row of said optical fiber ribbon cords and in said common ribbon plane defined by said row of said optical fiber cords;

a second sheath contacting and covering said first and second tension members and said optical fiber ribbon cords and fixating said optical fiber ribbon cords between said first and second tension members; and said second sheath having a first and second tear slot respectively formed in opposite outside surfaces of said second sheath to facilitate tearing away said second sheath from said row of optical fiber ribbon cords and said first and second tension members to permit terminal assembly.

6. A flat optical fiber cable according to claim 4, wherein said first and second tension have a thickness greater than a height of said optical fiber ribbon cords.

7. A flat optical fiber cable comprising:

an optical fiber ribbon including optical fiber cores disposed parallel one another in a row and defining a ribbon plane;

first and second tension members respectively disposed parallel to opposite sides of said optical fiber ribbon and in said ribbon plane; and a second sheath contacting and covering said optical fiber ribbon and said first and second tension members and fixating said optical fiber ribbon between said first and second tension members.

8. A flat optical fiber cable according to claim 7, comprising:

an optical fiber ribbon including optical fiber cores disposed parallel one another in a row and defining a ribbon plane;

first and second tension members respectively disposed parallel to opposite sides of said optical fiber ribbon and in said ribbon plane;

a second sheath covering said optical fiber ribbon and said first and second tension members; and said sheath having a first and second tear slot respectively formed in opposite outside surfaces of said sheath to facilitate tearing away said sheath from said optical fiber ribbon and said first and second tension members to permit terminal assembly.

9. A flat optical fiber cable according to claim 7, wherein said first and second tension have a thickness greater than a height of said optical fiber ribbon.

* * * * *